United States Patent [19]
von Fredersdorff, deceased et al.

[11] 3,802,993
[45] Apr. 9, 1974

[54] NON-FOSSIL FUEL PROCESS FOR PRODUCTION OF HYDROGEN AND OXYGEN

[75] Inventors: Claus George von Fredersdorff, deceased, late of Oak Park, Ill.; by George C. von Fredersdorff, administrator, Des Plaines, Ill.

[73] Assignee: Institute of Gas Technology, Chicago, Ill.

[22] Filed: Dec. 27, 1971

[21] Appl. No.: 211,960

[52] U.S. Cl................. 176/37, 176/39, 423/219, 423/579, 423/658
[51] Int. Cl............................................ G21c 9/00
[58] Field of Search ......... 176/10, 37, 38, 39, 92 R; 204/129; 423/648, 656, 657, 579, 594, 219, 248; 252/301.1; 23/204, 221, 210–214

[56] References Cited
UNITED STATES PATENTS

| | | | |
|---|---|---|---|
| 2,558,756 | 7/1951 | Jackson et al. | 423/579 |
| 2,671,013 | 3/1954 | Watson | 423/657 |
| 3,228,850 | 1/1966 | Fellows | 252/301.1 R |
| 3,335,062 | 8/1967 | Feates et al. | 176/92 R |
| 3,442,620 | 5/1969 | Huebler et al. | 423/658 |
| 3,535,082 | 10/1970 | Nurnberg et al. | 423/657 |
| 86,248 | 1/1869 | Phillips | 423/579 |

OTHER PUBLICATIONS

James V. Quagliano, Chemistry Second Edition, August, 1963, Prentice–Hall Inc., pp. 108–117.

*Primary Examiner*—Harvey E. Behrend
*Attorney, Agent, or Firm*—Molinare, Allegretti, Newitt & Witcoff

[57] ABSTRACT

Hydrogen and oxygen production by fissiochemical decomposition of carbon dioxide to produce carbon monoxide and oxygen, followed by subsequent separation of the oxygen from the carbon monoxide, and production of hydrogen by the action of steam on iron at elevated temperature followed by regeneration of the product iron oxide by carbon monoxide as separated from the fissiochemical decomposition products issuing from the nuclear reactor. The oxygen may be separated from the fissiochemical decomposition products by the formation of metal oxide by reaction with reactive metals such as iron, chromium, manganese and mercury. The process also employs steps for preventing build-up of oxygen concentrations to explosive levels, steps for recovery of radioisotopes, and the generation of steam.

18 Claims, 1 Drawing Figure

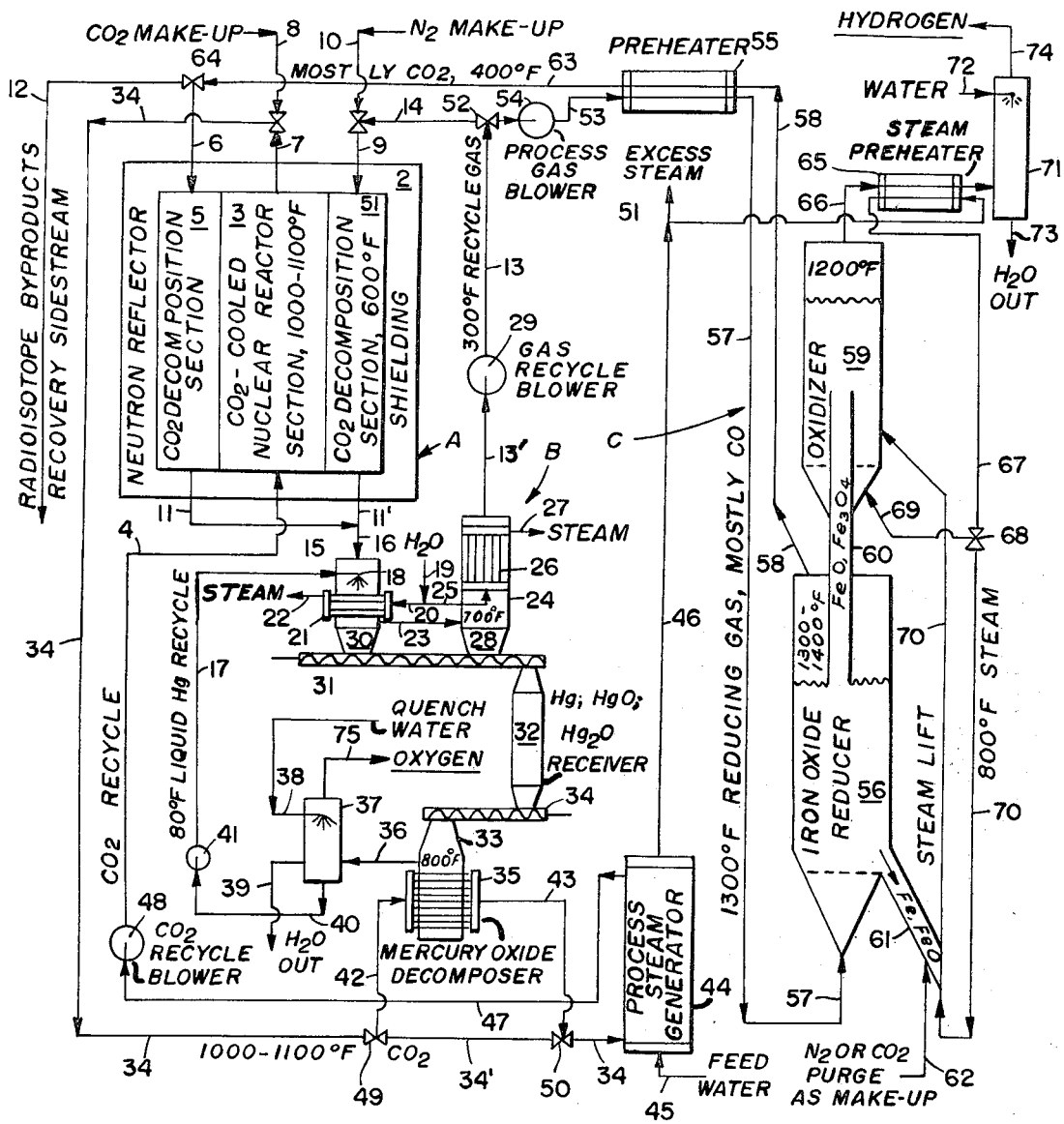

NON-FOSSIL FUEL PROCESS FOR PRODUCTION OF HYDROGEN AND OXYGEN

FIELD OF THE INVENTION

This invention relates to a process for generation of hydrogen and oxygen from water and involving fissiochemical decomposition of carbon dioxide. The hydrogen produced may be used as a fuel to augment fossil fuel supplies which are being rapidly depleted. The oxygen may be used in a variety of industrial processes, such as steel making, glass making, and the like.

BACKGROUND

Attempts to produce hydrogen gas by the reduction of water in chemical nuclear reactors have been unsuccessful primarily because the decomposition of water in such reactors yields an explosive mixture of hydrogen and oxygen. Further, the separation of the two gases is extremely difficult. Chemical scavenging of either of the two gases tends to induce an explosion of the unseparated mixture. Likewise, purely mechanical-thermodynamic separating techniques such as palladium-foil-diffusers also produce a similar effect.

The purpose of producing hydrogen by action of nuclear energy is to augment the rapidly depleting sources of fossil fuel supplies. In addition, sources of hydrogen are needed for applications in fuel cell technology, industrial processes, and the like.

In contrast to prior nuclear energy generation of hydrogen, conventional water-electrolysis hydrogen generating processes effectively separate the oxygen of the water from the hydrogen by actual physical separtion through production of the two components at different locations. In steam-hydrocarbon processes or steam-metal processes the two components are separated by chemical binding, which requires further processing to release the desired products. These processes however utilize fossil fuels, generally in excess of the fuel value achieved in the hydrogen production.

OBJECTS OF THIS INVENTION

Therefore, it is an object of this invention to produce hydrogen from water without the use of fossil fuel as either a reactant or a source of power.

It is another object to provide a method of producing hydrogen as a fuel from water and carbon dioxide, which process employs nuclear energy without the prior art dangers, inefficiencies and difficulties.

It is another object of this invention to provide a novel process of producing both hydrogen and oxygen from carbon dioxide and water utilizing nuclear energy in a safe, easily controlled process.

It is another object of this invention to provide a nuclear energy-utilizing process which produces as products from water and carbon dioxide, hydrogen, oxygen, isotopes and steam.

Still a further object of this invention will be apparent from the description which follows.

The following detailed description has reference to a drawing in which:

The FIGURE shows one embodiment, in schematic flow sheet form, of a process for hydrogen and oxygen production from nuclear decomposition of carbon dioxide and the utilization of water as a hydrogen source.

SUMMARY OF THE INVENTION

According to this invention, hydrogen and oxygen is produced by fissiochemical decomposition of carbon dioxide to yield carbon monoxide and oxygen. This is followed by separation of the oxygen from the carbon monoxide. Thereafter hydrogen is produced by the action of steam on iron at elevated temperature wherein the product iron oxide is regenerated by the carbon monoxide which was separated from the fissiochemical decomposition products issuing from the nuclear reactor. The oxygen may be separated from the fissiochemical decomposition products by the formation of metal oxide by reaction with reactive metals such as iron, chromium, manganese, mercury and barium. The process also employs steps for preventing build-up of oxygen concentrations to explosive levels, the recovery of radioisotopes, and the generation of steam.

DETAILED DESCRIPTION OF THE PREFERRED EMBODIMENT

Referring now to the FIGURE, letters A, B and C refer to the three major sections of the entire system: A refers to the nuclar fissiochemical decomposition of $CO_2$ section, B refers to the oxygen rcovery section, and C refers to the hydrogen production section.

In Section A, under the influence of nuclear fission energy, carbon dioxide chemically decomposes into its monoxide and oxygen via the overall reaction:

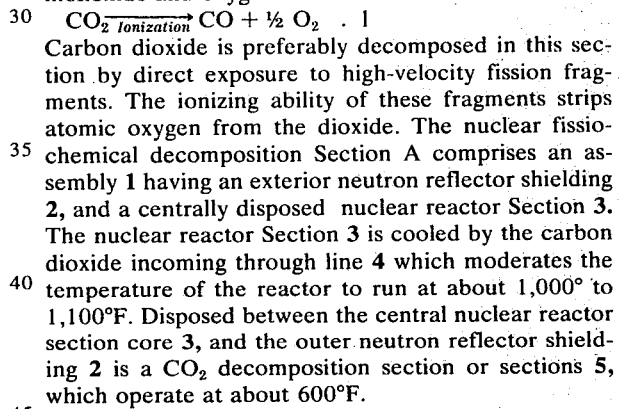

Carbon dioxide is preferably decomposed in this section by direct exposure to high-velocity fission fragments. The ionizing ability of these fragments strips atomic oxygen from the dioxide. The nuclear fissiochemical decomposition Section A comprises an assembly 1 having an exterior neutron reflector shielding 2, and a centrally disposed nuclear reactor Section 3. The nuclear reactor Section 3 is cooled by the carbon dioxide incoming through line 4 which moderates the temperature of the reactor to run at about 1,000° to 1,100°F. Disposed between the central nuclear reactor section core 3, and the outer neutron reflector shielding 2 is a $CO_2$ decomposition section or sections 5, which operate at about 600°F.

In operation, the carbon dioxide to be ionizingly decomposed in the nuclear fissiochemical decomposition Section A comes in through line 6 and passes into the decomposition sections 5 and 5'. The inlet $CO_2$ is approximately 400°F., but this temperature may be varied to provide optimum process conditions in Section C. In the $CO_2$ decomposition sections 5 and 5', the ionizing radiation and temperature operate to decompose the $CO_2$ to carbon monoxide and oxygen pursuant to reaction 1 above. At the same time, $CO_2$ gas being recycled from line 4 moderates the central nuclear reactor section 3, which is of conventional design. Recycle $CO_2$ is exhausted out line 7, and returned to other portions of the process system as described below. Make-up $CO_2$ may be added to the entire process conveniently at that stage through line 8, or at such other plate as will assist in optimizing the overall process.

In the $CO_2$ decomposition sections, the ionizing radiation may also result in the formation of carbon and carbon sub-oxide deposits via a sequence of reactions as follows:

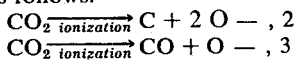

$CO + C \xrightarrow{thermal} C_2O$ — , 4

$C_2O + CO \xrightarrow{thermal} C_3O_2$ — , 5

Carbonaceous deposits are undesirable in the process since they hinder the continuous operation of the nuclear reactor carbon dioxide decomposition section. A process of the present invention eliminates or minimizes the elemental carbon and carbon suboxide formation through the use of a gasiform inhibitor such as nitrogen or nitrogen dioxide.

While there is no desire to be bound by theory, it is through that the mechanism for the inhibition is as follows:

$N_2 \xrightarrow{ionization} 2N$ — 6
$N + O \xrightarrow{thermal} NO$ — 7
$NO + O \xrightarrow{thermal} NO_2$ — 8
$NO_2 + C \xrightarrow{thermal} CO + NO$ — 9
$NO_2 + O \xrightarrow{thermal} O_2 + NO$ — 10
$2NO + O_2 \xrightarrow{thermal} 2 NO_2$ — 11

Therefore, in the process of this invention nitrogen or nitrogen dioxide is used as an inhibitor, which inhibitor gas is inlet into the decomposition section, for example through line 9. The inhibitor gas may initially be derived from nitrogen content of air. This is also convenient point to add any make-up nitrogen or nitrogen dioxide to the process through line 10.

The decomposition products, which include carbon dioxide, carbon monoxide, oxygen, small percentages of carbon and carbon suboxides, and the inhibitor gases are exhausted from the decomposition sections 5, 5' through lines 11, 11' from which they pass into the oxygen recovery Section B.

By the use of nitrogen or nitrogen dioxide as the inhibitor, small quantities of the radioactive isotope $C^{14}$ are also formed by interaction with the fast neutrons from the nuclear fission reactor:

$_7N^{14}O_2 + neutron \longrightarrow _6C^{14}O_2 + proton$ — 12

An important aspect of this process is to permit the build-up of $_6C^{14}O_2$ in the process stream, and to provide a subsequent recovery of the carbon 14 isotope by reaction of side stream 12 with a hydroxide, such as barium hydroxide, to form a stable carbon 14 carbonate:

$_6C^{14}O_2 + Ba(OH)_2 \longrightarrow Ba_6C^{14}O_3 + H_2O.$ — 13

This is shown schematically in the FIGURE by sidestream takeoff line 12, which leads to the hydroxide recovery system.

From the radioisotope byproducts sidestream, one is also able to recover efficient product gases such as $Kr^{90}$ and volatile radioactive decay products such as $Xe^{133}$ and $I^{135}$. The recovery is accomplished by conventional processes from the carbon dioxide decomposition streams 11, 11' or from the sidestream 12, after such radioisotopes have been permitted to accumulate in the system to a suitable concentration by continuous recycle.

It should be appreciated that in the nuclear reactor assembly the nuclear reactor section 3 operates as a heat transfer section with the $CO_2$ absorbing excess heat from the reactor and the decomposition section. The $CO_2$ stream 4, 7 is thereby preheated to above 900°F., and preferably in the range of 1,000° to 1,100° F., or above. Thus, this second $CO_2$ stream 4, 7 is not decomposed but serves as a heat carrying medium to supply the thermal requirements for the oxygen recovery system B, and for process steam generation as described in more detail below.

The $CO_2$ decomposition stream leaves the reactor via the lines 11 and 11' at temperature below 1,000° F. and preferably in the range of 500–700° F., e.g., about 600° F. Unreacted $CO_2$ in this stream is eventually recycled to the reactor after passing through the oxygen recovery process system B. A portion of this $CO_2$ recycle stream, which is separate from $CO_2$ recycle stream 4, 7, reenters the nuclear reactor in a temperature range of from 200° to 400° F, preferably 300° F, via lines 13 and 14 as described in more detail below. This direct recycle of low oxygen content gas directly from the oxygen recovery system B assists in preventing buildup of oxygen concentration to explosive levels in the decomposition section of the reactor assembly. The oxygen content of the carbon dioxide decomposition stream prior to oxygen recovery is maintained at 10 percent or less, and preferably 5 to 7 percent, depending on the CO concentration.

Focusing in more detail on the oxygen recovery system B, the decomposition products exhausting from the reactor via lines 11 and 11' enter a mercury reactor 15 through line 16. Liquid mercury enters the reactor at about 80°F., through line 17 wherein it is distributed into the gas by means of a spray head 18, or other suitable device. In the reactor 18 the liquid mercury reacts with the oxygen in the $CO_2$ decomposition stream in the temperature range from about 240° to 700° F., and from about 1 to 100 atmospheres pressure to form mercury oxides, including HgO and $Hg_2O$. The temperature of Hg reactor 15 is controlled by the use of water input via lines 19 and 20. The water passes through a heat exchanger assembly 21 wherein it forms steam and is withdrawn via line 22. This steam may be used for part of the process power requirements with the water being recycled, or may be vented as excess steam.

Gases are exhausted from reactor 15 via line 23 to separator 24 at a temperature of approximately 700° F. or less while liquid mercury oxides collect in the bottom 30 of reactor 15. These gases are rich in $O_2$ and contain some vaporous mercury and mercury oxides. These gases are cooled by water input through line 19 and 25, which passes through heat exchanger assembly 26 to be withdrawn as steam through line 27 for use in the manner described above for steam in line 22. The separator condenses the mercury oxide vapors where they collect in the lower portion of the separator 28. The remaining gas, containing mostly carbon monoxide is exhausted via line 13'. The power for further gas flow is provided by gas recycle blower 29.

The mercury and mercury oxides collected in both the lower portion of the separator 28 and the lower portion 30 of the reactor 15, are passed via collection line 13 to a mercury and mercury oxides receiver 32. From the receiver, the mercury and mercury oxides are passed on a controlled oxide receiver 32. From the receiver, the mercury and the mercury oxides are passed in a controlled and metered fashion to the mercury oxide decomposer 33 via line 34. The receiver also permits pressure reduction when the reaction with mercury has proceeded at elevated pressures.

In the mercury oxide decomposer 33, the mercury oxides are decomposed for oxygen recovery at temperatures about 500° F. and preferably in the range of from 700° to 900° F, typically 800° F. The temperature for the decomposition is provided by a tap off of carbon dioxide in line 34 which is at a temperature of approximately 1,000° to 1,100° F, after having moderated the temperature of the nuclear reactor section 3. The hot carbon dioxide is passed through a heat exchanger 35 disposed in the decomposer which heats the mercury and the mercury oxides. Oxygen and mercury vapor come off from the decomposer 33 in line 36 and are passed into quench chamber 37. The quench water 38 cools the mixture of oxygen and mercury vapor to the point where the mercury condenses and collects at the bottom of the chamber 37. The water floats on the top of the mercury, and can be withdrawn via line 39, while the mercury is withdrawn directly from the bottom of the chamber via line 40, and recycled via pump 41 and line 17 back to the liquid mercury contact reactor 15. Product $O_2$ is removed from quench chamber 37 via line 75.

The hot carbon dioxide from line 34, after having been passed through the heat exchanger 35 via lines 42 and 43, is returned to line 34 and passed into a process steam generator 44 fed by water from line 45. Process steam exits from generator 44 via line 46, and it then passes into the hydrogen production section C as described in more detail below. The hot carbon dioxide is cooled in producing the steam in generator 44, and is recycled back to the nuclear reactor section 3 via line 47, blower 48 and recycle line 4.

The recovery of oxygen by the above described oxygen recovery system B may be done through formation of various types of metal oxides. The use of mercury, a reactive metal, has been described here in detail for the purposes of illustration and not by way of limitation. Other metals such as iron, chromium, manganese, and barium possess the capability of reacting with oxygen to form thermally decomposable oxides.

Mercury is a preferred material, since oxidation of liquid mercury releases heat which is utilized for steam generation (see steam production at lines 22 and 27 in Section B). The oxidation reaction must be cooled to 300° F. or less, 1) to achieve nearly complete oxygen removal from the $CO_2$ decomposition stream and 2) to minimize mercury vapor losses. The heat of reaction for mercury oxidation at atmospheric pressure, in Btu/lb mole $O_2$ reacted is approximately as follows:

| Temp. °F | $2Hg(l)+O_2(g) \rightarrow 2HgO(s)$ | $4Hg(l)+O_2(g) \rightarrow 2Hg_2O(s)$ |
|---|---|---|
| 260 | −77,800 | −75,600 |
| 440 | −77,000 | −77,500 |
| 620 | −76,100 | −75,600 |
| 672 | −75,800 | −75,600 |
|  | $2Hg(g) + O_2(g) \rightarrow 2HgO(s)$ | $4Hg(g) + O_2(g) \rightarrow 2Hg_2O(s)$ |
| 672 | −126,600 | −178,100 |
| 800 | −125,400 | −176,200 |
| 980 | −123,800 | −173,000 |
| 1160 | −121,800 | −171,000 |
| 1340 | −119,500 | −169,000 |

As much or more heat as indicated in the above table is retransferred to mercury oxides to achieve decomposition. This is preferably accomplished by exchange with the high temperature $CO_2$ heat transfer stream from the nuclear reactor. Oxygen gas and liquid mercury are recovered by water quench of the mercury oxide decomposition products. Rapid quench is provided to prevent reversal of the reactions.

The equilibrium partial pressures, in atmospheres of oxygen and mercury vapor developed from decomposition of mercury oxides are approximately as given by the following values:

Decomposition of HgO

| Temperature, °F | Equilibrium Partial Pressure | |
|---|---|---|
|  | $O_2$ | Hg |
| 260 | $6(10^{-5})$ | $12(10^{-3})$ |
| 440 | $1.6(10^{-2})$ | $3.3(10^{-3})$ |
| 620 | $1.8(10^{-2})$ | $3.5(10^{-2})$ |
| 672 | 0.032 | 0.064 |
| 800 | 0.20 | 0.40 |
| 980 | 1.6 | 3.2 |
| 1160 | 7.9 | 15.8 |
| 1340 | 27.5 | 55 |

Decomposition of $Hg_2O$

| Temperature, °F | Equilibrium Partial Pressure | |
|---|---|---|
|  | $O_2$ | Hg |
| 672 | 0.11 | 0.44 |
| 800 | 0.59 | 2.36 |
| 980 | 3.2 | 12.8 |
| 1160 | 11.9 | 44.6 |
| 1340 | 34 | 136 |

It should be understood that by means of valves 49 and 50, the amount of hot carbon dioxide passing through the heat exchanger 35 may be regulated, while the excess carbon dioxide, if any, bypasses the heat exchanger via line 34' directly to the process steam generator 44. Any excess steam issuing from the process steam generator via line 46 may be bled off via line 51 or otherwise utilized as described above with respect to steam in lines 22 and 27.

Following the oxygen removal, a portion of the $CO_2$ decomposition recycle stream containing mostly carbon monoxide passes into the hydrogen production section C. The reduction gas for the steam-iron portion of the process containing primarily carbon monoxide, passes out of the separator 24 via line 13' and 13 to CO distribution valve 52 which splits the stream into a process gas stream 53, and a recycle stream 14 as above described. Process gas blower 54 passes the process gas in line 53 to a preheater 55, where by heat exchange with gases coming off the iron oxide reducing 56, the reducing gas is raised to a temperature on the order of 1,300°F. Correspondingly, the exhaust gas 58 from the iron oxide reducer 56 is cooled from a temperatue of in the range of 1,300°−1,400°F. to about 400°F. The preheated reducing gas in line 57 is then passed into the bottom of the iron oxide reducer 56.

The principal reactions occurring in reduction are $FeO + CO \longrightarrow Fe + CO_2 - 14$ $Fe_3O_4 + CO \longrightarrow 3FeO + CO_2 - 15$ Reaction 14 is exothermic; however the endothermic reaction 15 predominates, making the overall reduction phase endothermic. The iron oxide reducer 56 operates above 1,300° F. and preferably 1,500°−1,700° F, as higher temperatures favor more complete reduction and better utilization of the carbon monoxide. The heat requirements are supplied by preheating the reducing gas 57 with the effluent gases 58 containing mostly $CO_2$ as described above, and by mass transport of an excess amount of iron oxides as heat carrier from the oxidizer section 59 which is overall exothermic. The total heat effect of reduction and oxidation in the steam-iron part of this process is exothermic.

In the reduction section 56, iron oxides downcoming from the oxidizer section 59 via fill pipe 60 are reduced by the carbon monoxide in the reducing gas incoming through line 57 by the reactions described just above, reactions 14 and 15. Reducing gas may be adjusted in flow to fluidize the iron particles in the reducer 56, or the bed may be relatively static allowing for gradual settling by removal of the reduced iron oxides to standpipe 61 from a lower portion of the reduce 56.

The reduced iron oxides in the form of Fe and FeO are collected in the standpipe 61 and purged with small amounts of $N_2$ or pure $CO_2$ or mixtures thereof via line 62 to strip occluded and entrained radioisotopic gases from the solids. The rate of purging is adjusted according to the system make-up requirements and to compensate for the volume of circulating gases withdrawn as a sidestream for radioisotope byproducts recovery via lines 58 and 63, valve 64 and line 12.

Hydrogen is produced in oxidation section 59 by the sponteneous reactions at 1,000°–1,400°F, preferably 1,200° F, of iron and its lower oxide with steam:

$$Fe + H_2O \longrightarrow FeO + H_2 - 16$$
$$3FeO + H_2O \longrightarrow Fe_3O_4 + H_2 - 17$$

Process steam generated at suitable pressures in line 46 is preheated in preheater 65 to 700°–900° F, typically 800° F, by indirect exchange with the oxidizer effluent gasses in line 66. The preheated steam in line 67 may be distributed by valve 68 directly to the oxidizer section 59 via line 69. A portion of the preheated steam is also used to lift the Fe and FeO from standpipe 61. The steam in line 69 may be adjusted to fluidized the Fe-FeO bed in oxidizer section 59 if desired.

The hydrogen-rich effluent gas from the oxidizer section passes through line 66, exchanges its heat in steam preheater 65, and passes into scrubber 71. In the scrubber, water input via line 72 and taken off via line 73 yields essentially pure produce hydrogen in line 74 which contains negligible or no radioactivity.

An analysis of the steam-iron section of this process indicates that there is a 50 to 80 percent utilization of carbon dioxide for reduction, depending on the reaction temperature in the range indicated and the inlet $CO/CO_2$ ratio, and a 50 to 70 percent decomposition of the steam, depending upon the reaction temperature in the range indicated above.

Exemplary of the advantages of the process of this invention are the results given below in Table I. In this example, the process parameters were as follows:

1. Gas Compositions, vol %

| Component | $CO_2$ | CO | $O_2$ | $NO_2$ | $N_2O$ | $N_2$ |
|---|---|---|---|---|---|---|
| a) Leaving $CO_2$ decomposition section via lines 11 and 11' | 25 | 50 | 6 | 3 | 2 | 14 |
| b) Entering iron oxide reducer via line 57 | 26.6 | 53.2 | — | 3.2 | 2.1 | 14.9 |
| c) Leaving iron oxide reducer via line 58 | 69.1 | 10.7 | — | 3.2 | 2.1 | 14.9 |
| d) Entering $CO_2$ decomposition section via line 6 | 39.4 | 40.4 | — | 3.2 | 2.1 | 14.9 |

2. 40% of nuclear energy converted to chemical energy in carbon dioxide decomposition products;
3. 80% of incoming CO utilized in steam-iron reactions;
4. 60% of incoming steam decomposed in steam-iron reactions;
5. Recycle ratio of 2.3 moles $CO_2$ decomposition gases recycled to nuclear reactor per mole reducing gas entering steam-iron process.

Table I. Process Performance

| A. Thermal Quantities; datum 60° F. | Btu per Mole Gas to Reducer | Btu per $10^6$ Btu Nuclear Energy |
|---|---|---|
| 1. Energy converted in $CO_2$ decomposition | 51,900 | 400,000 |
| 2. Heat transferred to $CO_2$ stream | 71,052 | 548,000 |
| 3. Preliminary cooling in $O_2$ removal unit | 9,160 | 70,600 |
| 4. Final cooling in $O_2$ removal unit | 11,080 | 85,400 |
| 5. Heat required for mercury oxide decomposition | 26,900 | 207,000 |
| 6. Mercury vapor-oxygen gas quench | 13,670 | 105,000 |
| 7. Heat available for steam generation | 64,392 | 497,000 |
| 8. Enthalpy, 100 psi steam for steam-iron process | 14,850 | 114,500 |
| 9. Enthalpy, excess steam | 49,542 | 383,000 |
| 10. Enthalpy, raw gas from oxidizer | 6,930 | 53,300 |
| 11. Overall exothermicity | 4,530 | 34,900 of steam-iron process |
| 12. Gross heating value, hydrogen | 51,400 | 396,000 |
| 13. Heat loss allowance | 17,398 | 132,800 |
| B. Products | | |
| 1. Hydrogen, SCF | 161 | 1,240 |
| 2. Oxygen, SCF | 80.5 | 620 |
| 3. 100 psi excess steam lb | 42.71 | 329 |
| C. Heat content of $H_2$ and excess steam % | 77.9 | 77.9 |

As discussed above, mercury is a preferred metal for recovery of oxygen in system B. In addition to metal-metal oxide recovery systems, other physical and chemical recovery systems can be used. For example, cryogenic separation of the $CO_2$, CO and $O_2$ in the product $CO_2$ decomposition stream 11 may be employed, with the $CO_2$ recycled to line 4, the CO passed into line 13' and the oxygen recovered as a product gas via line 75. Since the three gases have separate and distinct phase change temperatures, mechanical compression with cryogenic distillation serves as an excellent mode of the gas separation and $O_2$ recovery.

Several chemical processes may also be employed. In one alternative of this invention, the gas from line 11 is fed into a reactor in contact with vapourous chlorine gas at low temperature. The CO in the feed gas from line 11 reacts with the chlorine to form phosgene, $COCL_2$. The phosgene is easily separated from the by-product $O_2$—$CO_2$ containing stream, and heated in a separate zone to produce CO and $CL_2$. The CO is then fed into line 13' for continuation of the processing to recover the CO values to produce $H_2$.

In another alternative, the CO in stream 11 is reacted directly with $H_2O$ or a base such as NaOH or $NH_4OH$ to form formic acid or its salts. The acid or salts are then decomposed to obtain CO and water with the two being separated easily by condensation of the water, and forwarding the CO on to system C via line 13'.

In the case of sodium hydroxide, the salt sodium formate is obtained. At higher temperatures, the salt decomposes into hydrogen and the corresponding oxalate salt, sodium oxalate. In turn the sodium oxalate is decomposed into sodium carbonate, $Na_2CO_3$ and $CO_2$. The sodium carbonate can be reacted with water to form sodium hydroxide and $CO_2$. The $CO_2$ from the latter two stages of decomposition is recycled to line 47 and the NaOH to the contact reactor into which the $CO_2$ decomposition gas is initially fed. In this alternative embodiment, hydrogen and CO are formed, the CO later in system C being used to produce hydrogen from water. This embodiment thus has the advantage of having two hydrogen source streams.

As an alternative to the steam-iron process of system C, the CO-rich gas in line 57 may be reacted directly with water in a conventional water-gas shift reactor. There the CO reacts directly with water under catalytic conditions to product $H_2$ and $CO_2$.

To the extent that NO builds up in $CO_2$ decomposition stream 16 from input of diluting $N_2$ via line 10, the NO may be removed by chlorination as above described for the production of phosgene. The product is nitrosyl chloride, NOCL, which is separated and then decomposed at higher temperatures to produce NO and chlorine as streams separate from the $CO_2$ decomposition stream. The NO separated is then ejected.

The physical and thermodynamic parameters of these alternative recoveries being already known, further description is not required. The use of these separation and recovery steps in the entire process of this invention is new, and results in the improved result of producing hydrogen without depletion of fossil fuels or the venting of $CO_2$ to the atmosphere as waste.

It should be understood that modification may be made in the process of this invention while remaining within the scope and spirit thereof.

I claim:

1. A process for the production of oxygen and hydrogen comprising the steps of:
   a. passing a first $CO_2$-rich gas stream in admixture with $N_2$ or $NO_2$ to inhibit undesired decomposition reactions into exposure to nuclear radiation in a nuclear reactor at a temperature below about 1,000°F. to produce an admixture of CO and $O_2$ as a gaseous fissio-chemical decomposition product stream;
   b. separating said $O_2$ as a product gas stream from said fissio-chemical decomposition product stream to produce a CO-rich gas stream;
   c. recycling a portion of said CO-rich gas stream to the nuclear reactor to prevent oxygen concentration buildup therein;
   d. reacting steam with a source of reduced iron compounds to produce oxidized iron compounds and a hydrogen-rich effluent gas;
   e. separating said hydrogen-rich gas as a product gas stream from said oxidation;
   f. reacting a portion of said CO-rich gas stream with said oxidized iron compounds to produce a second $CO_2$-rich gas stream and reduced iron compounds;
   g. recycling the second $CO_2$-rich gas stream produced by the oxidation of iron compounds to the nuclear reactor to be converted to CO and $O_2$ in admixture with said first $CO_2$ stream; and
   h. recycling the reduced iron compound from step (f) to step (d) as a source of reduced iron compounds in said steam,
   i. said process further characterized as producing $_6C_{14}O_2$ as a radioisotope by-product,
   j. permitting said $_6C^{14}O_2$ to build up in the $CO_2$ recycled to the nuclear reaction from said iron oxide reduction reaction and,
   k. withdrawing a portion of said $CO_2$ recycle stream and contacting said stream with a hydroxide to form a stable $_6C^{14}$ carbonate.

2. A process as in claim 1 wherein said step of separating said $O_2$ from said fissio-chemical decomposition products includes the step of:
   reacting the $O_2$ in said decomposition product gas stream with a compound selected from the group consisting of a metal, chlorine, water, or a base, to produce an oxide and said CO-rich gas stream.

3. A process in claim 1 wherein said step of separating said $O_2$ from said fissio-chemical decomposition products includes the steps of:
   reacting the CO in said decomposition product gas stream with chlorine to form a phosgene-rich gas stream; and
   heating said phosgene stream to form a CO-rich gas stream.

4. A process as in claim 1 wherein said step of separating said $O_2$ from said fissio-chemical decomposition products includes the added steps of:
   reacting the CO in said decomposition product gas stream with water to produce formic acid; and
   heating said formic acid to produce a CO-rich gas stream.

5. A process as in claim 1 wherein said step of separating said $O_2$ from said fissio-chemical decomposition products includes the steps of:
   reacting the CO in said decomposition product gas stream with a base to produce a formic acid salt; and
   heating said salt to produce a CO-rich gas stream.

6. A process as in claim 5 wherein said base is selected from NaOH and $NH_4OH$.

7. A process as in claim 6 wherein said base is NaOH and wherein said heating step produces hydrogen gas and sodium oxalate, and which includes the added steps of:
   heating said sodium oxalate to form sodium carbonate and $CO_2$; and
   reacting said sodium carbonate with water to form sodium hydroxide and $CO_2$.

8. A process as in claim 1 wherein said step of separating said $O_2$ from said fissio-chemical decomposition products includes the steps of:
   reacting the $O_2$ in said decomposition product gas stream with a metal, to produce a metal oxide and said CO-rich gas stream; and
   thermally decomposing said metal oxide to produce $O_2$ and said metal.

9. A process as in claim 8 wherein the heat required to thermally decompose said metal oxide is in part provided by heat exchanging a heated $CO_2$ stream obtained in moderating the temperature of said nuclear reactor.

10. A process as in claim 8 wherein said metal is selected from iron chromium, manganese, mercury and barium.

11. A process as in claim 10 wherein said metal is mercury.

12. A process as in claim 1 wherein said decomposition products gaseous stream is at a temperature in the range from 500° – 700°F.

13. A process as in claim 1 wherein said radiation is high velocity fission fragments.

14. A process as in claim 8 wherein said reaction to form a metal oxide is maintained in a temperature range of from about 240°F. to 700°F. and at from about 1 to 100 atmospheres pressure.

15. A process as in claim 11 wherein said mercury oxides are decomposed at a temperature above 500°F.

16. A process as in claim 15 wherein said decomposition is maintained in a range of from 700°F. to 900°F.

17. A process as in claim 1 wherein said steam-iron reaction is maintained at a temperature in the range of from about 1,000°F. to 1,400°F., and said reducing of oxidized iron compounds is maintained at a temperature above about 1,300°F.

18. A process as in claim 17 wherein the reduced iron compounds produced in the conversion of CO and water are purged with a gas selected from $N_2$, $CO_2$ and mixtures thereof to strip occluded or entrained radioisotopic gases from said iron compounds.

* * * * *